United States Patent [19]

Wu

[11] Patent Number: 4,723,077
[45] Date of Patent: Feb. 2, 1988

[54] DUAL LIQUID CRYSTAL LIGHT VALVE BASED VISIBLE-TO-INFRARED DYNAMIC IMAGE CONVERTER SYSTEM

[75] Inventor: Shin-Tson Wu, Northridge, Calif.

[73] Assignee: Hughes Aircraft Company, Los Angeles, Calif.

[21] Appl. No.: 805,635

[22] Filed: Dec. 6, 1985

[51] Int. Cl.$^4$ .............................................. G02F 1/137
[52] U.S. Cl. .......................... 250/504 R; 250/252.1; 250/445.1; 350/347 F
[58] Field of Search .................. 250/331, 330, 504 R, 250/495.1, 493.1, 252.1; 350/347 R, 347 E

[56] References Cited

U.S. PATENT DOCUMENTS

| | | | |
|---|---|---|---|
| 3,694,053 | 9/1972 | Kahn. | |
| 3,824,002 | 7/1974 | Beard | 250/331 |
| 4,019,807 | 4/1977 | Boswell et al. | 250/213 R |
| 4,114,991 | 9/1978 | Bleha | 350/338 |
| 4,124,278 | 11/1978 | Grinberg et al. | 350/347 R |
| 4,228,449 | 10/1980 | Braatz | 357/30 |
| 4,378,955 | 4/1983 | Bleha | 350/334 |

OTHER PUBLICATIONS

U. Efron et al, "The Silicon Liquid Crystal Light Valve", Journal of Applied Physics 57, No. 4, Feb. 15, 1985, pp. 1356 to 1368.
S. T. Wu et al, "Infrared Liquid Crystal Light Valve", presented at SPIE Annual Technical Symposium, San Diego, CA, Aug. 1985.
U. Efron et al, "Liquid Crystal-Based Visible to IR Dynamic Image Converter", SPIE Proceedings, vol. 465, 1984, pp. 181-191.
J. Grinberg et al, "A New Real-Time Non-Coherent to Coherent Light Image Converter", Optical Engineering, vol. 14, Jun. 1975, pp. 217-225.

Primary Examiner—Carolyn E. Fields
Attorney, Agent, or Firm—V. D. Duraiswamy; V. G. Laslo; A. W. Karambelas

[57] ABSTRACT

A visible-to-infrared image converter system (10) utilizes a source of infrared light (15), a polarizing beam splitter (19) for separating the infrared light into two polarized beams having their polarity at ninety degrees to one another, and first and second image converters (12, 13) positioned at right angles to one another, each to receive one of the two polarized beams. A source of identical visible information (21) furnishes information to each of the image converters (12, 13) which modulate the infrared beams and reflect them for recombination by the polarizing beam splitter (19).

6 Claims, 4 Drawing Figures

DUAL LIQUID CRYSTAL LIGHT VALVE BASED VISIBLE-TO-INFRARED DYNAMIC IMAGE CONVERTER SYSTEM

BACKGROUND OF THE INVENTION

This invention relates to image converter systems and, more particularly, to a dual visible-to-infrared dynamic image converter system utilizing liquid crystal light valves to provide especially rapid switching, improved efficiency, and application over longer wavelengths.

A visible-to-infrared dynamic image converter is a device which transforms dynamically-changing visible scenes to infrared images of those scenes. Such converters have many uses. One of these uses is in target simulation systems used for nondestructive testing of infrared homing devices. In prior art simulation systems, thin-film material is illuminated with a high intensity beam of visible light containing useful information. The film heats locally at the high intensity points and emits an infrared power pattern related to the spatial information presented by the high intensity visible input beam. These thermal based systems suffer from low resolution caused by thermal spread in the image plane, slow response caused by large thermal time constants, and a limited dynamic range.

A visible-to-infrared dynamic image converter has been disclosed by U. Efron et al, "The Silicon Liquid Crystal Light Valve," *Journal of Applied Physics* 57, Feb. 15, 1985, which utilizes a cathode ray tube or computer image generator to provide visual images to activate a visible-light sensitive photoconductor coupled with an oxide layer to form an MOS structure. The photoactivated carriers reduce the resistance of the silicon and cause a spatial voltage pattern corresponding to the visible input light intensity to be transferred to a liquid crystal film which creates a highly resolved spatial electric field pattern. The intensity of an infrared beam is modulated in accordance with this pattern to produce a non-thermal image which gives high resolution and fast response while having low power requirements and allowing direct addressing by computer image generation systems.

Such a system, although a substantial improvement over the thermal sensing systems used for testing of infrared homing devices, would be more useful if it were able to provide more rapid switching, had higher efficiency, and could be used over a greater range of wavelengths.

SUMMARY OF THE INVENTION

It is an object of this invention to improve visible-to-infrared image converters by increasing the rate of switching, the efficiency, and the range of wavelengths over which they are capable of operating.

These and other objects of this invention are realized in a sysem which includes a pair of silicon-liquid crystal light valves positioned to receive one of two orthogonal polarizations of an infrared beam provided by a polarizing beam splitter. The light valves are controlled by a computer image generation system which modulates the two infrared beams simultaneously.

In a preferred embodiment, each silicon liquid-crystal light valve utilizes a homogeneously aligned liquid crystal substance arranged with its optical axis substantially normal to the incoming beam and 45° to the polarization of the infrared light imaging thereon. Infrared light reflected from the light valves is affected by the birefringence characteristic of the liquid crystal material and produces, upon reflection, a phase retardation of that light, which retardation causes the polarizer not to transmit light to an output projection lens. If an A.C. voltage is placed across the liquid crystal, its optical axis is reoriented perpendicular to the infrared light polarization plane. Accordingly, the valve has no effect on the polarization of light reflected by the cell. This reflected light is transmitted by the polarizer to the output lens. Such a liquid crystl cell arrangement provides for very rapid switching, high contrasts, and an increased dynamic range.

Other objects and advantages of the invention will be better understood by reference to the specification taken in conjunction with the detailed drawings in which like reference numerals refer to like elements throughout the various views.

DETAILED DESCRIPTION OF THE INVENTION

Figure 1:
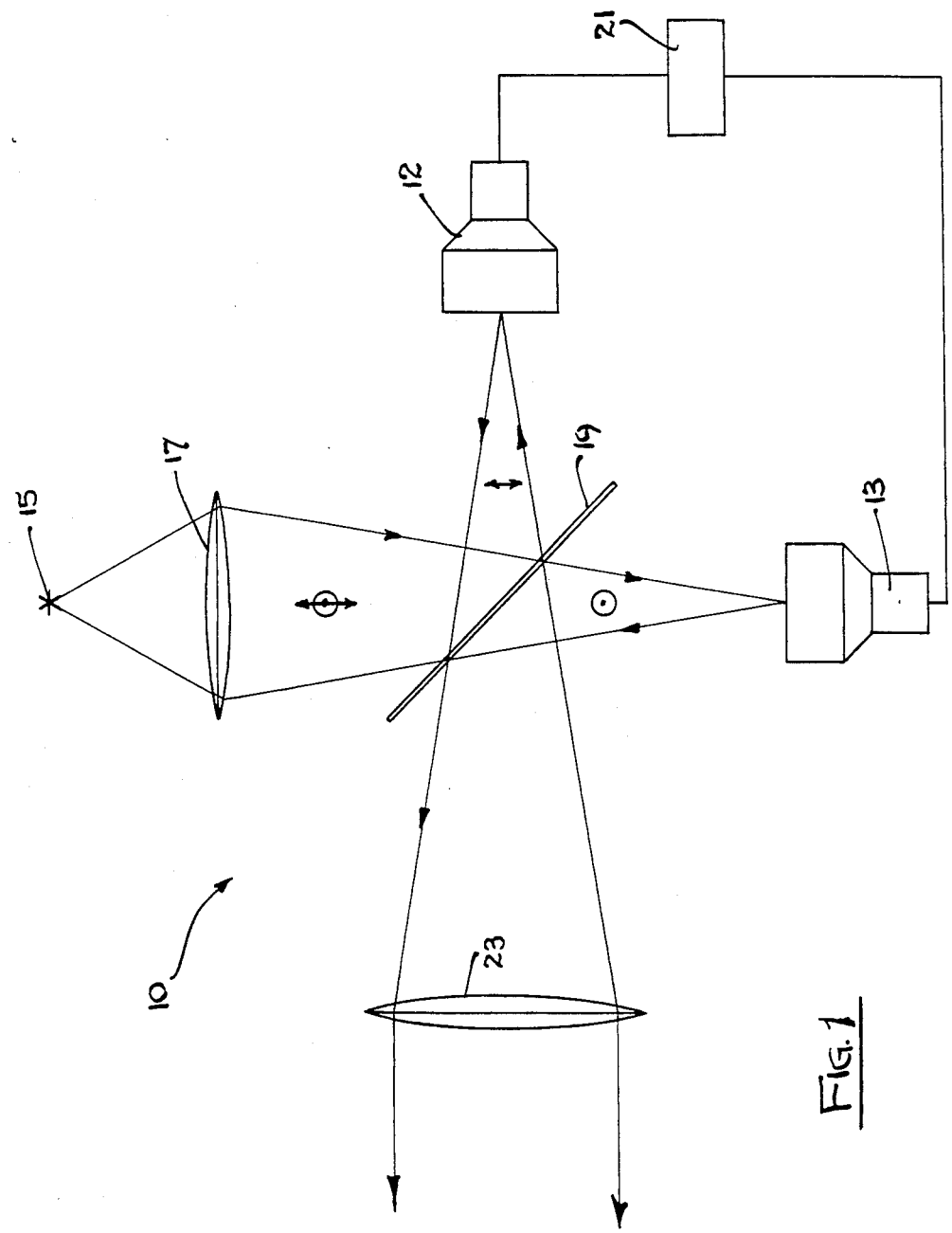
FIG. 1 is a view of a dual visible-to-infrared dynamic image converter constructed in accordance with the invention.

FIG. 1 illustrates a system 10 which is constructed in accordance with the invention. The system 10 includes a pair of visible-to-infrared dynamic image converters 12 and 13 which are essentially identical. The image converters 12 and 13 receive infrared light from an infrared source 15 which is projected through a focusing lens 17 onto a polarizing beam splitter 19 which in a preferred embodiment may be a wire grid, a device known in the art. As is shown in FIG. 1, a beam having a polarization in a first plane is reflected to image converter 12 by a polarizing beam splitter 19 while a beam polarized ninety degrees thereto is passed by polarizing beam splitter 19 to image converter 13.

Each of the image converters 12 and 13 is positioned equidistant from beam splitter 19 and is modulated by information from an image generator 21. Image generator 21 comprises apparatus for electronically projecting an image, such as but not limited to, a computer. The modulated infrared beams are returned from the two image converters 12 and 13 and transferred by beam splitter 19, now acting as an analyzer, to a projection lens 23 to be utilized for non-destructive testing purposes. Projection lens 23 is conveniently placed one focal length from the focal plane of image converters 12 and 13 so that the infrared image appears to an observing detector, such as an infrared seeker, to be coming from infinity.

It will be appreciated that the two image converters 12 and 13 receive the same information from generator 21 and, consequently, modulate the beams passed thereto in essentially identical manners. When these beams are recomposed at beam splitter 19 and passed through lens 23, they provide a total intensity which is twice that of a system utilizing a single image converter. On the other hand, the dual light valve image converter uses a liquid crystal which is just half the thickness of that used in the single light valve image converter to achieve the same modulation efficiency (or dynamic range) while improving the response times by a factor of four since the response times are proportional to the square of the liquid crystal thickness.

Figure 2:
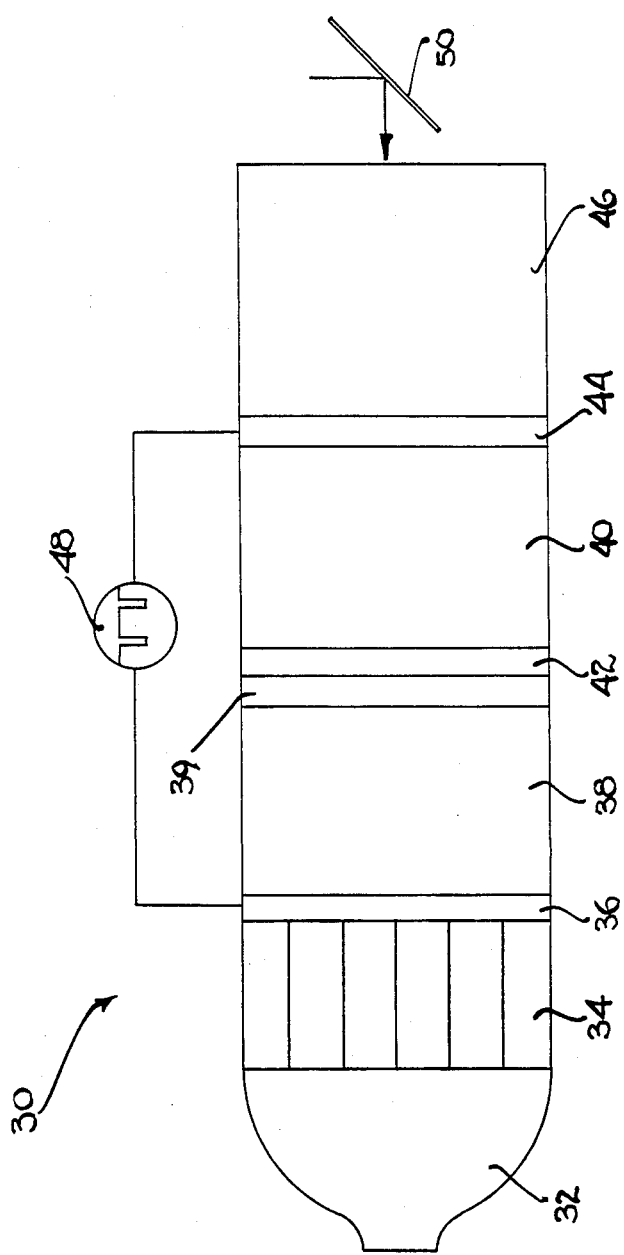
FIG. 2 is a cross-sectional view of one of the image converters shown in FIG. 1.

FIG. 2 illustrates a single visible-to-infrared dynamic image converter 30 which may be utilized in the invention described in FIG. 1. The image converter 30 shown in FIG. 2 includes a source of visual images 32 which, in this case, is depicted as a cathode ray tube. The cathode ray tube may be provided information from an image generator such as that shown in FIG. 1. The source of images 32 projects those visible images through a fiber optic plate 34. The visible light is transmitted by fiber optic plate 34 through a transparent electrode 36 to a silicon photoconductor 38 coupled to an oxide layer to form an MOS structure. The dynamic visible scenes created by the visible light are used to activate a high resistivity silicon wafer 38. The photoactivated carriers reduce the resistance of the silicon and cause a spatial voltage pattern corresponding to the visible input light intensity to be transferred to a high impedence liquid crystal layer 40. A detailed description of the operation of silicon photoconductor 38 and silicon dioxide layer 39 is given in the afore-mentioned article by U. Efron et al, "The Silicon Liquid Crystal Light Valve."

The liquid crystal layer 40 is joined to silicon photoconductor 38 and oxide layer 30 by an infrared mirror 42. In the preferred embodimentt, mirror 42 may be a reflective grid constructed by plating a metallic layer on the surface of oxide layer 30 and etching the metallic layer to leave isolated islands of metallic material which reflect the infrared rays. Such a grid mirror is used because dielectric mirrors have proved to have too high an electrical impedance and a solid metallic mirror would short out the charge pattern from photoconductor 38. This mirror 42 reflects infrared rays impinging thereon. Opposite mirror 42 and adjacent liquid crystal layer 40 is a second transparent electrode 44. Electrode 44 may be indium tin oxide which separates liquid crystal layer 40 from, and is plated on, an infrared transparent window 46, or an antireflection layer coated germanium window. The AR-coated germanium window is found to have both good optical transparency in the infrared and good electrical conductivity as needed to be a good counterelectrode candidate.

Control voltages are applied to electrodes 36 and 44 by a source 48. These voltages are chosen to provide a long depletion or active state and a very short refresh state for photoconductor 38. The details of the selection of the control voltages is given in the aforementioned article by U. Efron et al, "The Silicon Liquid Crystal Light Valve."

In operation, infrared light of a selected polarity is transmitted by way of a mirror 50 (which may in a selected case be a polarizing beam splitter such as that which is shown in FIG. 1) to the infrared transparent window 46. The light passes through window 46 and transparent electrode 44 and into liquid crystral layer 40. The infrared light is reflected by mirror 42 and back through liquid crystal layer 40. Depending on the voltage condition of electrode 44 and the spatial voltage pattern placed by photoconductor 38 and oxide layer 39, at the interface with liquid crystal wafer 40, the polarization of the infrared light reflected by mirror 42 and passed back through liquid crystal wafer 40 is or is not changed. Depending on that polarization, the reflected infrared light does or does not pass a polarizer used as an analyzer (not shown in FIG. 2 but being such as beam splitter 19 of FIG. 1).

Figure 3:
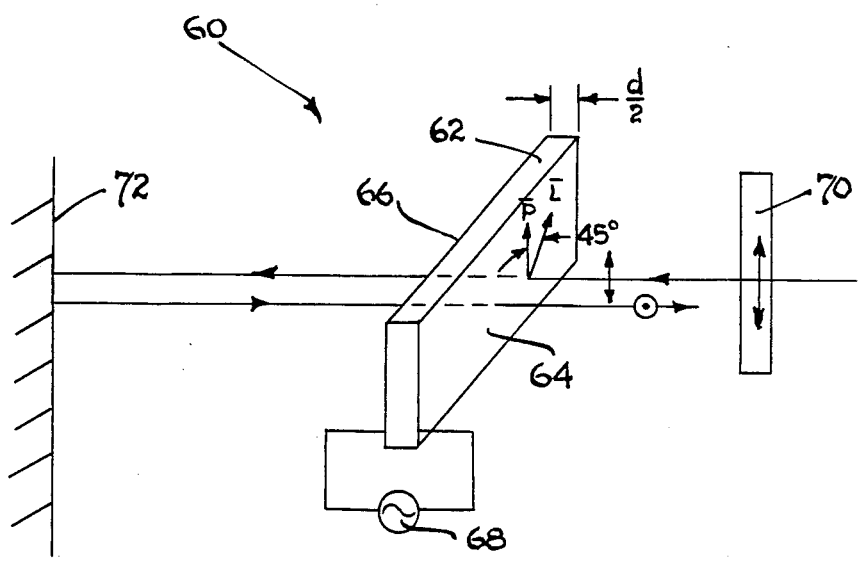
FIG. 3 is a side view of a liquid crystal cell which may be used in the image converter of FIG. 2.
Figure 4:
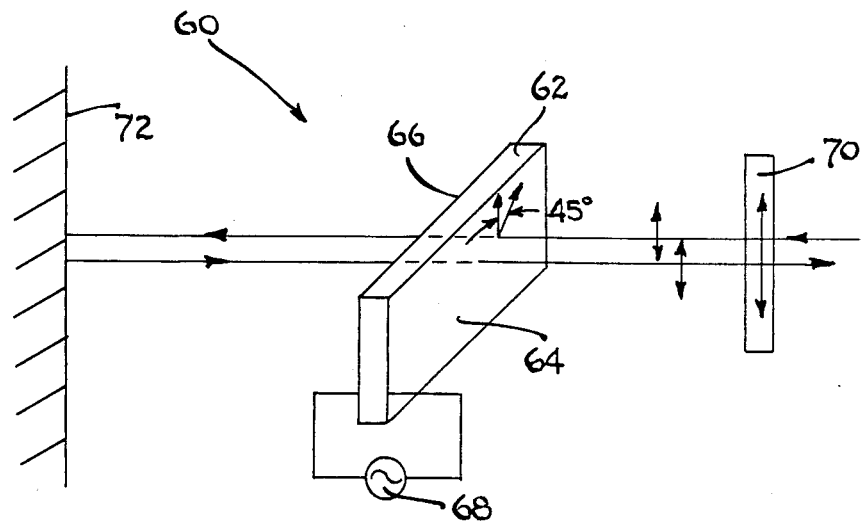
FIG. 4 is another side view of a liquid crystal cell which may be used in the image converter of FIG. 2.

FIG. 3 and 4 are block diagrams used to explain the operation of liquid crystal layer 40 in the preferred embodiment of the invention.

Although ninety and forty-five degree twisted nematic liquid crystal cells may be used to produce light valves in accordance with the invention (see FIG. 1 of the aforementioned article by U. Efron et al), they tend to be slow in response. This occurs because to obtain a sufficient twist of the light polarization in the infrared region, it is necessary to increase the thickness of the liquid crystal material in such cells to a degree such that the response to voltage changes is slower; thus, the cell operates at a slower rate. Increasing the thickness of the liquid crystal material also has the undesired effect of both reducing the efficiency and the contrast of the cell.

FIG. 3 illustrates an arrangement 60 which may be utilized to overcome those problems in this invention. The arrangement 60 includes a liquid crystal material 62 separating a pair of parallel infrared transparent elements 64 and 66. Elements 64 and 66 are treated in a manner well-known in the art to cause the optical axis of liquid crystal material 62 to lie parallel to an orientation direction along the immediately adjacent surface of element 64 or 66. In the present case, the two elements 64 and 66 are placed to have their orientation directions substantially parallel to one another so that the liquid crystal material is not twisted.

Although not shown in detail in FIG. 3, light valve arrangement 60 has transparent electrodes coated on the interior surfaces of elements 64 and 66 in a manner well-known in the art; and a source of A.C. voltage 68 is connected across these electrodes for producing a field effect in liquid crystal material 60.

Positioned between a source of infrared light and liquid crystal material 62 is a polarizer 70 oriented to accept light polarized in accordance with the arrow drawn thereon. This orientation is selected to be substantially forty-five degrees to the direction of the optical axis of the liquid crystal material at the surface of glass element 64. On the other side of liquid crystal material 62 is a mirror 72 positioned parallel to elements 64 and 66 to reflect light transferred through liquid cyrstal material 62.

When infrared light is directed toward polarizer 70, the light which passes therethrough is oriented at forty-five degrees to the optical axis of liquid crystal material 62 at the surface of element 64. It is well-known that liquid crystal material produces a birefringent effect which depends on the direction of the electric field of the light passing therethrough. The velocity of light passing through liquid crystal material varies depending on the polarization of the light because the liquid crystal material has different indices of refraction parallel and perpendicular to the orientation of the optical axis of the liquid crystal material. The birefingence of the material is defined as the difference in these indices of refraction.

Consequently, the light oriented at forty-five degrees to the optical axis of the liquid crystal material at the surface of element 64 has equal components, one such component being parallel to the optical axis of the liquid crystal material and affected by a first index of refraction and a second component being perpendicular to the optical axis and affected by a second index of refraction.

It is apparent that these components traveling through liquid crystal material 62 are differently affected (transferred slower and faster through liquid crystal material 62) and after traveling some distance are out of phase. If the polarity of the light is sampled at any distance by reconstructing the light from the two components, it is found that the polarity of the light has been rotated from its initial polarity. Consequently, by selecting the thickness of liquid crystal material 62 so that the phase difference of the components of the light after traveling the distance to the mirror and back through liquid crystal material 62 is equal to $\pi$, the components of the infrared ray when reconstituted are found to produce a light wave which has its polarity rotated by ninety degrees. Such a light wave is unable to pass polarizer 70, and the dark state of the cell if produced.

FIG. 4 illustrates the operation of arrangement 60 when a voltage 68 is applied across the transparent electrodes of elements 64 and 66. The voltage causes the optical axis of liquid crystal material 62 to become perpendicular to elements 64 and 66. In this orientation, the light passing through liquid crystal material 62 does not encounter different indices of refraction and, consequently, does not have its polarity rotated. Thus, when reflected by mirror 72 back through liquid crystal material 62, the light is at the same polarity as when it first passed polarizer 70 and passes therethrough producing the light condition of the cell.

Faster response times may be obtained by using thinner liquid crystal material which provides less than a complete ninety degree phase difference. With a sufficient intensity of light, such as system provides adequate dark and light states. A system of this sort is described in a paper entitled "Infrared Liquid Crystal Light Valve," S. T. Wu et al, presented at the SPIE Annual Technical Symposium, San Diego, Calif., August 1985.

It has been determined that cells constructed as described are much thinner than are twisted nematic crystal devices adapted to be used with the same frequencies. Consequently, such cells operate at much faster rates, have higher contrast, and are more efficient than are the twisted crystal devices.

Moreover, contrary to expectation, it has been determined that devices so constructed display a relatively broad bandwidth characteristic at the infrared frequencies. In particular, it has been determined that the polarization extinction ratio is excellent at wavelengths equal to or greater than two microns; and, consequently, such devices display excellent contrast.

A liquid crystal cell of this type may be used as the liquid crystal cell of the image converters of FIGS. 1 and 2 to secure these benefits for image converter systems. For example, the liquid crystal layer 40 of FIG. 2 may be formed in the manner described in FIGS. 3 and 4 with the transparent electrode 66 being replaced by the spatial voltage pattern at the interface between the surface of wafer 40 and oxide layer 39. The bias voltage 48 replaces voltage 68 of FIGS. 3 and 4, whereby the voltage differences between transparent electrode 44 and the surface of wafer 40 at mirror 42 depend on the spatial voltages caused by the visible light source projected from source 32.

Thus, a visible-to-infrared dynamic image converter system is created which gives very fast response times, high contrast infrared images, very good resolution, greater effciency, and a long range of wavelengths. Although the invention has been described herein with reference to particular detailed embodiments, many modifications will occur to those skilled in the art which are within the spirit and scope of the invention. It is, therefore, intended that the invention be limited only by the language of the claims which are appended hereto.

What is claimed is:

1. A visible-to-infrared image converter system utilizing an infrared beam source for transferring a visible image into an infrared image comprising:
   a source of infrared light;
   means for separating said infrared light into two polarized beams having their polarity substantially at ninety degrees to one another;
   first and second image converters, each of said converters being positioned to receive one of the two polarized beams;
   means for providing substantially identical visible information to each of the image converters for modulating an infrared beam associated therewith;
   means for analyzing the modulated infrared beams produced by the two image converters; and
   means for recombining the two modulated infrared beams into a single beam.

2. A visible-to-infrared image converter system as claimed in claim 1 in which said means for separating said infrared light into two polarized beams having their polarities at ninety degrees to one another comprises a polarizing beam splitter positioned at forty-five degrees to the path of the infrared light from said source and substantially equidistant from each of said two image converters.

3. A visible-to-infrared image converter system as claimed in claim 1 in which each of said image converters comprises:
   a reflective liquid crystal cell having first and second parallel surfaces, the first of said surfaces being arranged to receive infrared light;
   transparent electrode means positioned adjacent said first surface;
   means for placing voltages on the transparent electrode; and
   means for placing a spatial pattern of voltages representing visible information presented to each of the image converters on said second surface.

4. A visible-to-infrared image converter system as claimed in claim 3 in which said liquid crystal cell comprises:
   a liquid crystal having an optical axis of alignment;
   a supporting transparent plate positioned adjacent the first surface, the transparent plate supporting the transparent electrode;
   means for causing the optical axis of said liquid crystal to be substantially perpendicular to the path of the infrared light therethrough in the state of the liquid crystal in which no voltage exists thereacross; and
   means adjacent said second surface of said liquid crystal for reflecting the infrared light back through said liquid crystal.

5. A visible-to-infrared image converter system as claimed in claim 4 in which said means for reflecting the infrared light comprises a metalized grid.

6. A visible-to-infrared image converter system as claimed in claim 5 in which said liquid crystal has a thickness which is selected so that it has a birefringence characteristic without voltage thereacross which induces a change in the polarization of infrared light of preselected frequencies proceeding through said liquid crystal sufficient that the polarization of such light is rotated by ninety degrees after reflection from said liquid crystal material.

* * * * *